United States Patent [19]

Takahashi

[11] 4,009,427
[45] Feb. 22, 1977

[54] ADAPTIVE CONTROL SYSTEM FOR AN ALTERNATING-CURRENT MOTOR
[76] Inventor: Shuichi Takahashi, 1-16, Takaido-higashi 1-chome, Suminami, Tokyo, Japan
[22] Filed: Jan. 22, 1975
[21] Appl. No.: 543,026
[30] Foreign Application Priority Data
Feb. 25, 1974 Japan ............................ 49-21403
[52] U.S. Cl. .............................. 318/227; 318/230; 318/231
[51] Int. Cl.² ........................................ H02P 5/40
[58] Field of Search ........... 318/171, 227, 230, 231
[56] References Cited
UNITED STATES PATENTS

| | | | |
|---|---|---|---|
| 3,372,323 | 3/1968 | Guyeska | 318/231 X |
| 3,593,083 | 7/1971 | Blaschke | 318/227 |
| 3,700,986 | 10/1972 | Cushman et al. | 318/231 X |
| 3,731,169 | 5/1973 | Burgholte et al. | 318/227 |
| 3,769,564 | 10/1973 | Rettig | 318/227 |
| 3,878,445 | 4/1975 | Kirkham et al. | 318/227 |

Primary Examiner—Gene Z. Rubinson
Attorney, Agent, or Firm—Charles E. Pfund

[57] ABSTRACT

A poly-phase alternating-current induction (or synchronous) motor is used as a servo-motor in a feedback control system. The motor is supplied by a variable frequency and variable voltage poly-phase alternating-current power supply. Two different frequency signals are generated, the one being a control frequency signal which is proportional to the error signal and the other being an acceleration frequency signal which produces a predetermined slip frequency with reference to the motor velocity (or a predetermined load angle with reference to the motor rotation angle) in the direction to reduce the error signal. Either one of the two frequency signals which is nearer to the frequency of the motor velocity, controls the variable frequency of the alternating-current power supply.

13 Claims, 15 Drawing Figures

ADAPTIVE CONTROL SYSTEM FOR AN ALTERNATING-CURRENT MOTOR

BACKGROUND OF THE INVENTION

This invention relates to a control system for an alternating-current motor, and more particularly to an adaptive control system for a poly-phase induction (or synchronous) motor.

Speed control means for controlling the speed of an induction (or a synchronous) motor by varying the supply frequency, and voltage control means for controlling the supply voltage as a function of the controlled frequency are heretofore well known. In those heretofore known control systems, however, an adaptive control mechanism, with which a desired performance of the motor is maintained, is not provided.

Therefore, it has been difficult to design a feedback control system of excellent characteristics using a general type induction (or synchronous) motor as the servo-motor. Thus, a direct-current motor or a two-phase induction motor with a control winding has been used as the servo-motor in these control systems.

Although a direct-current motor is expensive and has maintenance difficulties and the amplifier for the control winding of a two-phase motor is inefficient, these disadvantages have been considered inevitable.

Since induction motors and synchronous motors are inexpensive, can stand rough treatment, and can easily be speed-controlled when supplied by a variable frequency power source, it has been desired to use these alternating-current motors as servo-motors in feedback control systems.

BRIEF SUMMARY OF INVENTION

It is therefore a general object of the present invention to provide an adaptive control system with which an alternating-current motor is controlled smoothly and precisely by the command signal of a feedback control system.

More particularly, an object of this invention is to provide a positioning control system of excellent characteristics using a poly-phase induction (or synchronous) motor as the servo-motor.

Another object of this invention is to provide a programmed control system using a poly-phase induction (or synchronous) motor as the drive motor which precisely follows the programmed positioning signal.

Further object of this invention is to provide an adaptive control system with which the efficiency of an alternating-current motor is controlled in a required performance.

Still another object of this invention is to provide an adaptive control system in which the heretofore known control of the exciting current of a synchronous motor is combined with the control system of this invention.

For a better understanding of the invention, its operating advantages, and specific objects attained by its use, reference should be had to the accompanying drawings and descriptive matter in which there are illustrated and described several preferred embodiments of this invention.

DESCRIPTION OF THE DRAWINGS

In the drawings:

FIG. 11 illustrates several examples of analog circuits adapted to be used in the present invention, in which FIG. 11 a is a voltage signal generator, FIG. 11 b is a detector of the load angle, FIG. 11 c is a detector of the voltage induced by the rotating field in an induction motor, and FIG. 11 d is a frequency generator (or a phase shifter) of this invention.

DETAILED DESCRIPTION OF THE INVENTION

Some elementary performance formulas as functions of the variable frequency for an induction motor and for a synchronous motor are to be deduced, since most of the heretofore known performance formulas are for a fixed frequency.

Figure 1:
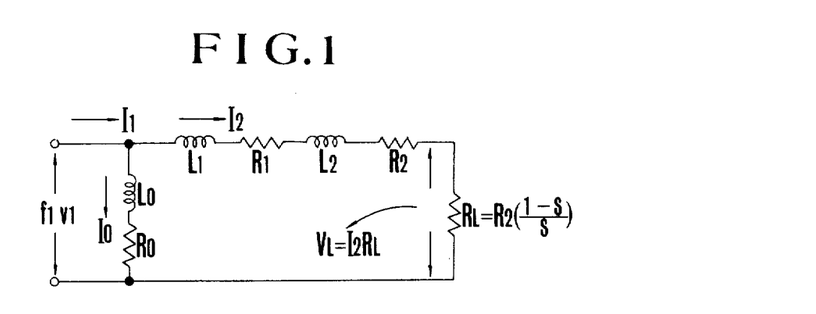
FIG. 1 is a simplified equivalent circuit diagram of a poly-phase induction motor.
Figure 9A:
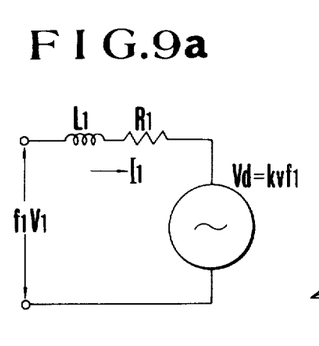
FIGS. 9a and 9b are respectively a simplified equivalent circuit diagram and a vector diagram of a poly-phase synchronous motor.
Figure 9B:
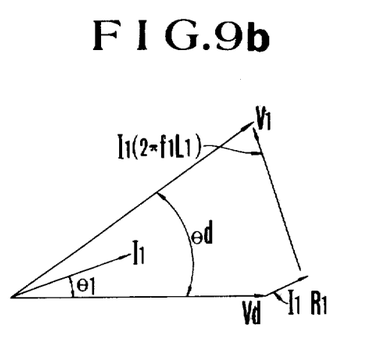

Referring to FIG. 1 for an induction motor and FIG. 9 for a synchronous motor, $V_1$ and $f_1$ are respectively the voltage and frequency of a poly-phase power supply. $I_1$ represents the total input current of an induction motor (FIG. 1) or the armature current of a synchronous motor (FIG. 9). $I_o$, $L_o$, and $R_o$ are respectively the exciting (or no-load) current, the no-load inductance, and the no-load equivalent resistance of an induction motor (FIG. 1). $L_1$ and $R_1$ are respectively the inductance and the resistance of the primary winding of an induction motor (FIG. 1) or those of the armature winding of a synchronous motor (FIG. 9). $L_2$ and $R_2$ are respectively the inductance and the resistance of the secondary winding of an induction motor, the values being in primary terms. $V_L$ represents the electromotive force induced by the rotating magnetic field of an induction motor, the value being in primary terms. $V_d$ represents the electromotive force induced by the rotation of the magnetic poles in a synchronous motor (FIG. 9).

In an induction motor, $\dot{I}_2 = \dot{I}_1 - \dot{I}_o$, $R_L = L/I_2$, $R_L = 2(1 - S)/S$, and $S = (f_1 - f_2)/f_1$, where $f_2$ is the frequency of rotation of the motor multiplied by the number of pole-pairs. Throughout the following explanations, motor velocity will be represented by $f_2$, which represents the electrical rotational frequency of the rotor of the motor and which is equal to the revolutions per second of the rotor multiplied by the number of pole-pairs of the motor. Also the velocity of the load coupled to the motor will be represented by $f_2$, the gear ratio being normalized for unity.

In a synchronous motor $V_d = K_w f_2 = K_w f_1$, since $f_2 = f_1$ in a stationary rotation. Referring to FIG. 9b, $\theta_1$ is the phase angle between $V_d$ and $I_1$, and $\theta_d$ is the phase angle between $V_1$ and $V_d$, which is called the load angle.

The torque $T_1$ (watt per frequency) developed in an induction motor is $$T_1 = I_2 V_L / f_2$$
$$= V_1^2 R_2 \frac{f_s}{(2\pi f_1)^2 (L_1 + L_2)^2 f_s^2 + (R_1 f_s + R_2 f_1)^2} \quad (1)$$

where $f_s = f_1 - f_2$. Hereinafter $f_s$ will be called a slip frequency.

$R_2^2 f_1 = f_s^2 \{R_1^2 + (2\pi f_1)^2 (L_1 + L_2)^2\}$ is obtained by $\delta T_1/\delta f_s = 0$. This equation is reduced to $$f_s = \frac{R_2}{2\pi (L_1 + L_2)} \quad (2)$$

when $R_1^2$ is negligible compared to $(2\pi f_1)^2 (L_1 + L_2)^2$. Equation (2) defines the slip frequency $f_s$ which develops the maximum torque $T_1$ of an induction motor. This slip frequency will hereinafter be designated by $f_T$. It must be noted that $f_T$ in equation (2) is independent of $f_1$.

When $f_s = f_T$ $$\dot{V}_L = \dot{I}_2 R_L = \frac{\dot{V}_1 R_L}{(R_1 + R_2 + R_L) + j(2\pi f_1)(L_1 + L_2)} \quad (3)$$
$$= \frac{V_1}{1+j}$$

and therefore, the voltage drop $\dot{V}_2$ is $$\dot{V}_2 = \dot{V}_1 - \dot{V}_L = \frac{jV_1}{1+j} \quad (3)'$$

The torque $T_2$ developed in a synchronous motor is $$T_2 = I_1 V_d \cos \theta_1 / f_1$$
$$= \frac{V_d}{f_1} \cdot \frac{V_1 \{R_1 \cos \theta_d + (2\pi f_1 L_1) \sin \theta_d\} - V_d R_1}{R_1^2 + (2\pi f_1 L_1)^2} \quad (1)'$$

$T_2$ is maximum where $$\tan \theta_d = \frac{2\pi f_1 L_1}{R_1} \quad (2)'$$

The load angle $\theta_d$ which develops the maximum torque will hereinafter be designated by $\theta_T$ and is approximately 90° (independent of $f_1$) when $R_1$ is negligible compared to $2\pi f_1 L_1$.

It will be easily understood from the foregoing equations that the torque $T_1$ can be controlled by controlling the slip frequency $f_s$ and the torque $T_2$ can be controlled by controlling the load angle $\theta_d$, and that the magnitude of $f_s$ should not exceed the magnitude of $f_T$ and the magnitude of $\theta_d$ should not exceed the magnitude of $\theta_T$.

The values of $f_1, f_2, f_s, \theta_d$ may be either positive (clockwise rotation) or negative (counterclockwise rotation). The directon of $f_1$ means the direction of the phase rotation of the supply frequency. The direction of $f_2$ is the direction of the motor rotation. The direction of $T_1$ is determined by the direction of $f_s$ (equation 1). The direction of $T_2$ is somewhat complicated, but when $R_1$ is negligibly small and the value of $(V_1 - V_d)$ is not large, the direction of $T_2$ is determined by the direction of $(\sin \theta_d)/f_1$.

When the direction of $T_1$ is opposite to that of $f_2$, the induction motor will be decelerated (braked), and when $T_2$ is negative, that is, when the direction of $\sin \theta_d$ is opposite to that of $f_1$, the synchronous motor will be decelerated (braked).

It is an important basic principle of this invention that $f_s$ and $\theta_d$ can easily be controlled by changing $f_1$ in reference to $f_2$. Since the moment of inertia of a motor prevents the rapid change of $f_2$, the change in $f_1$ is balanced, in the transient period, by the change in $f_s$. As the change of the load angle $\theta_d$ is the time integration of $(f_1 - f_2)$, the change in $f_1$ is also balanced, in the transient period, by the change in $\theta_d$.

Obviously, the balance is $$f_1 - f_2 = f_s \quad (4)$$

$$f_1 - f_2 = p\theta_d \quad (5)$$

where $p$ denotes the differential operator $d/dt$.

Of course, $\theta_d$ may be controlled by directly controlling the phase angle of the supply frequency. As a phase multiplied by $p$ is equal to a frequency, it should be understood that the phase control is included in the term "frequency control" in the following explanations.

Equation (4) signifies that an induction motor is a frequency synthesizing device, and equation (5) signifies that a synchronous motor is a phase shifting circuit. This frequency synthesizing device (or phase shifting circuit) is included in a closed feedback loop of the control system of this invention for generating an adaptive supply frequency (or phase).

Figure 2:
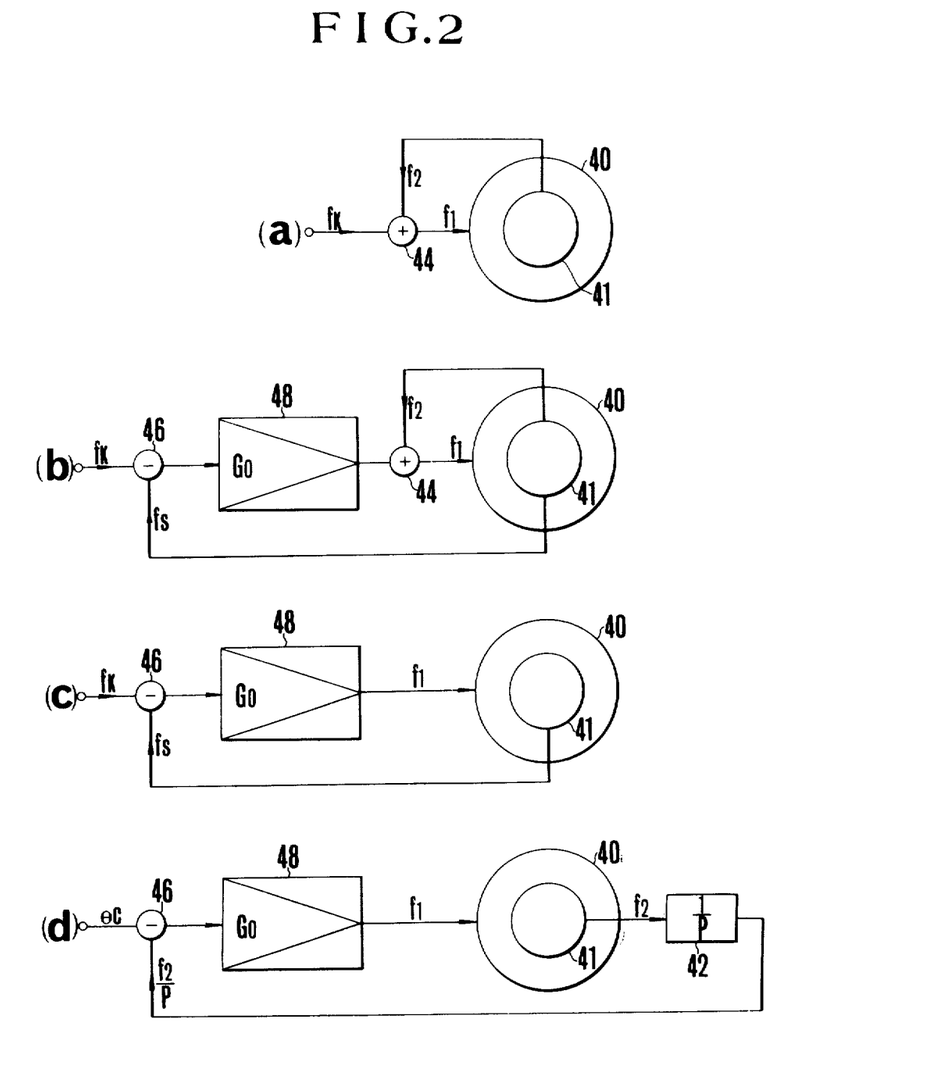
FIG. 2 is a schematic block diagram illustrating several examples of frequency generating circuits in which an induction motor is included in a closed feedback loop.

FIG. 2 illustrates several examples of such frequency generating circuits for an induction motor where a predetermined value $f_k$ of slip frequency is the commanded value. In FIG. 2 (a), $f_k$ is directly added to $f_2$ through an adder 44 to generate the supply frequency $f_1$. In FIG. 2 (b), $f_s$ is feedback-controlled wherein an amplifier amplifies the error signal $(f_k - f_s)$ and $f_1$ is generated in a relation $$f_1 = f_2 + G_o (f_k - f_s) \quad (6).$$

In FIG. 2 (c, $f_1$ is directly feedback-controlled in a relation $$f_1 = G_o (f_k - f_s) \quad (7).$$

When the slip frequency is controlled by the error signal (not shown in the drawing)

$$f_1 = f_2 + G_1 (\theta c - \theta a) \quad (6)'$$

where $\theta c$ is the commanded angular position and $\theta a$ is the controlled angular position which is $\theta a = f_2/p$.

In FIG. 2 (d), $f_1$ is directly feedback-controlled by the error signal $$f_1 = G_1 (\theta_c - \theta a) \tag{7}'$$

We obtain $f_s = G_o f_k/(G_o + 1)$, $f_s = G_o f_k/(G_o + 1) - f_2/(G_o + 1)$, $f_s = G_1(\theta_c - \theta a)$, $f_s = G_1\{\theta c - (1 + p/G_1)\theta a\}$, respectively from equations (6), (7), (6)', (7)'. It is obvious that equations (6) and (7) give a same $f_s$ which is equal to $f_k$ when $G_o$ is large, and equations (6)' and (7)' give a same $f_s$ when $G_1$ is large.

It must be understood that the adaptive supply frequency of this invention can be generated by any one of these frequency generating methods, although a method preferred on occasion will be explained with reference to the embodiments of this invention.

The frequency generating methods for a synchronous motor where $\theta_k$ is the commanded value of the load angle, are similar to those methods explained for an induction motor, and no further explanation will be necessary.

Figure 3:
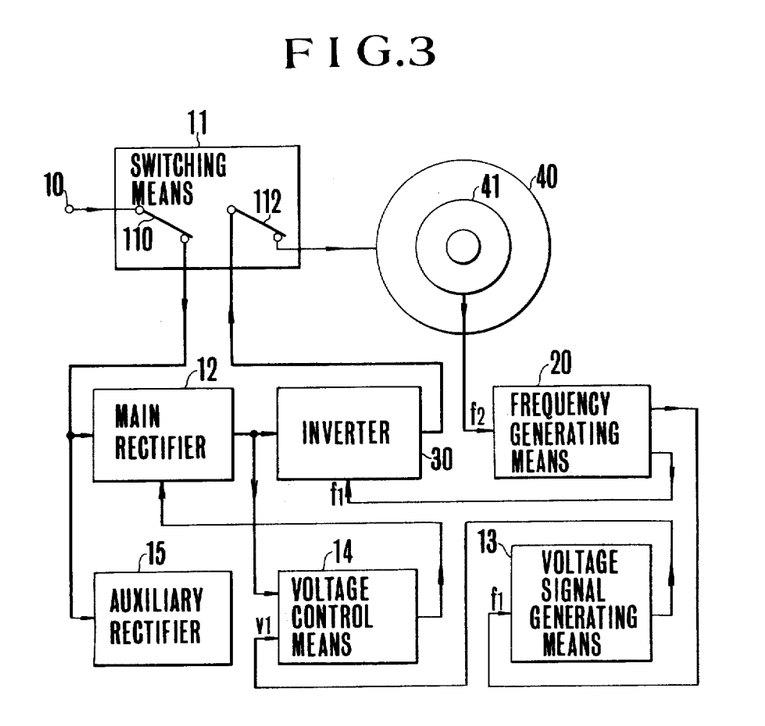
FIG. 3 is a schematic block diagram of an integrated system of one embodiment of this invention.

An integrated system diagram of an embodiment of this invention is illustrated in FIG. 3. This integrated system of FIG. 3 can be used either with an induction motor or with a synchronous motor.

In the first place, an induction motor control system will be explained. Through contact 110 of switching means 11, an alternating-current power from a power receiving terminal 10 is supplied to main rectifier 12 and auxiliary rectifier 15. (In all the accompanying drawings, the return line for a direct-current power supply and for a signal transmission is abbreviated, and one set of multi-digit signal transmission lines is represented by a single line.) Main rectifier 12 supplies the rectified direct-current power to inverter 30 which generates poly-phase alternating-current power of the amplitude corresponding to the supplied direct-current voltage. Auxiliary rectifier 15 energizes voltage signal generator means 13, voltage control means 14, and frequency generating means 20. (Power supply lines from auxiliary rectifier 15 are not shown in the drawing). Frequency generating means 20 receives the velocity signal $f_2$ from tachometer generator 41 connected to the shaft of motor 40 and generates a frequency $f_1$ which is delivered to inverter 30 to control the frequency and the direction of the phase rotation of the alternating-current power generated by inverter 30.

Voltage signal generator means 13 receives the frequency signal $f_1$, generates a voltage signal $V_1$ which is delivered to voltage control means 14. Voltage control means 14 controls the rectified voltage of main rectifier 12, using the voltage signal $V_1$ as the reference value.

The generated poly-phase alternating-current power is supplied from inverter means 30 to induction motor 40 through contact 112.

Since main rectifier 12, auxiliary rectifier 15, voltage control means 14, and inverter means 30 are well known in this technological field, and since any conventional system other than the system shown in FIG. 3 may be used for the purpose of generating variable frequency variable voltage poly-phase alternating-current power supply, no further explanation on main rectifier 12, auxiliary rectifier 15, voltage control means 14, and inverter means 30 will be necessary.

Frequency generating means 20 of this invention has a basic circuit for an elementary control purpose and supplementary circuits for more precise and particular control purposes. The basic circuit will be explained in the first place.

A most simple control is the starting control. The motor has to reach the commanded velocity with its attainable maximum acceleration. In this case, the slip frequency is to be set, in one preference, at $f_T$. (Refer to equation 2). In practice, however, from consideration of other performance items of the motor, there may be cases where the slip frequency is set at a predetermined value $f_k$ which is not larger than $f_T$. This predetermined value $f_k$ will be called a first value of slip frequency and the value $f_1$ which is defined by $f_1 = f_2 + f_k$ will be called an acceleration frequency.

For the starting control, contact 112 in switch means 11 is preferably a delay contact switch and closes after a short delay from the closure of contact 110. In this short delay time, the values of $f_1$ and $V_1$ become stationary, and a poly-phase alternating-current power is supplied through contact 112 to induction motor 40. Before switch means 11 is operated, motor 40 is at standstill, that is $f_2 = 0$, and frequency $f_1 = f_k$ is supplied to the motor as the starting frequency.

Motor 40 is accelerated and $f_2$ increases resulting in the corresponding increase in supply frequency $f_1$.

Figure 4:
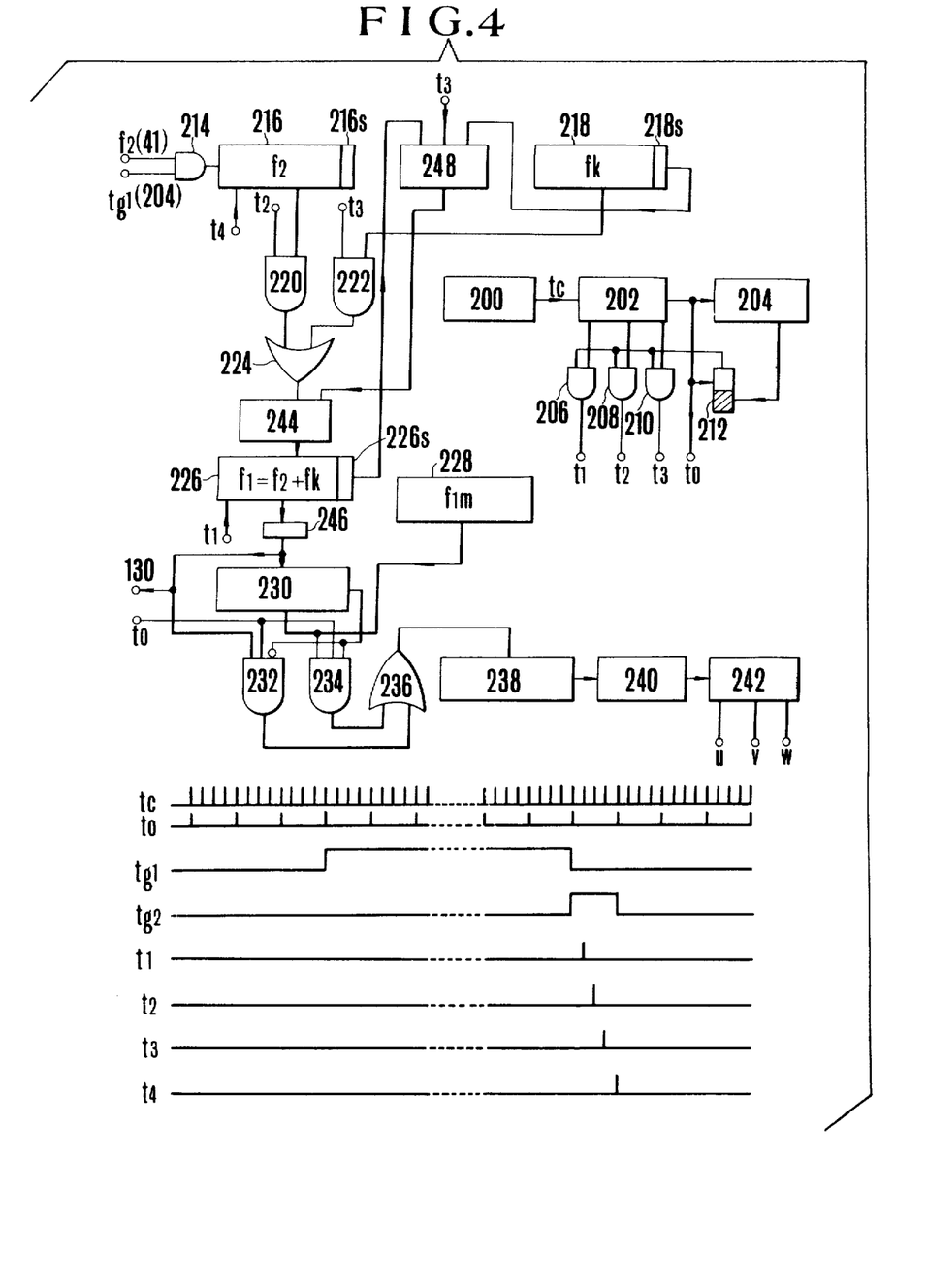
FIG. 4 is a schematic block diagram of an embodiment of means for generating the acceleration frequency with a legend showing various waveforms.

Any conventional type frequency convertor means may be used to generate $f_1$ from $f_2$ and $f_k$. One of such frequency generating means is illustrated in FIG. 4. A clock generator 200 generates a high frequency pulse train, for example 98,304 Hz pulse. (It must be noted that numerical examples throughout this specification are only for the purpose of explanation). Counter 202, which may be a cascaded binary type conventional pulse counter having a countphase detector logic circuit, receives the 98,304 Hz pulse and produces 24,576 Hz pulse at phase angles 0°, 90°, 180°, and 270° respectively. The 0° phase 24,576 Hz pulse will be designated by $t_o$. At each one $t_o$ pulse, the contents of register 226 which is the acceleration frequency signal $f_1$ is repeatedly added to accumulator 238 through gate means 232, 236. Gate means 232, 236 are digital adder logic circuits and have a circuit configuraton corresponding to the type of the register and the accumulator concerned. As digital adder logic circuits are well known in the technological field of digital computers, details of these circuits are abbreviated and denoted simply by gate means.

In the following explanations, it is further assumed that all numerical values are pure binary, and all registers and accumulators are for binary numbers. When accumulator 238 has 8 bit capacity above the decimal point of 1 Hz, the number of overflow pulses per second from accumulator 238, which is added by $f_1$ at a rate of 24,576 times per second, will be $24,576 f_1/2^8 = 96f_1$ pulses, that is, have an average frequency of $96f_1$. This $96f_1$ output pulse is divided by 32 through counter 240, and $3f_1$ output pulse is delivered to counter 242.

Counter 242 has a count-phase detector logic circuit and delivers 0°, 120° and 240° pulse of frequency $f_1$ to inverter 30 for controlling the supply frequency and the direction of the phase rotation.

Counter 242 has been explained as a three-phase pulse generator. It will be easy to generate pulses having any number of phases in a similar way. For the sake of simplification, the following explanations will be on three-phase motors. But it should be understood that the present invention is applicable to any poly-phase motors, including two-phase motors.

When the capacity of accumulator 238 is not an integral multiple of the value $f_1$, the output pulse frequency $f_1$ from counter 242 will be phase-modulated. When accumulator 238 has 8 bit capacity and $f_1$ is 50, for example, the generated frequency will be either 50.05 Hz or 49.95 Hz. This amount of phase modulation is allowable for most of practical applications.

The value of $f_1$ in register 226 must be renovated as $f_2$ changes. For this purpose, a rectangular gate $tg1$ and timing pulses $t_1$, $t_2$, $t_3$, $t_4$ are generated. The $t_o$ pulse from counter 202 is frequency-divided by counter 204 to generate a rectangular waveform 16 Hz which is denoted by $tg1$ and is shown partly in the wave-form diagram of FIG. 4. The rectangular waveform $tg1$ opens AND-gate 214 during the positive half cycle of the 16 Hz period, that is, during 1/32 second. Tachometer 41 may be conventional type, and in this embodiment, tachometer 41 is assumed to be a rotary type pulse generator of 32 $f_2$ pulse frequency. This 32 $f_2$ pulse is delivered to the other input terminal of gate 214. Since gate 214 opens 1/32 second for each cycle of 16 Hz, the total number of pulses which pass through gate 214 during one half cycle of 16 Hz is $f_2$.

Flip-flop 212 is triggered on by the trailing edge of $tg1$ and is triggered off by the succeeding $t_o$ pulse to generate a gate pulse $tg2$. The trailing edge of $tg2$ gate pulse generates timing pulse $t4$.

The 90°, 180°, and 270° pulses from counter 202 are delivered to AND-gates 206, 208, 210 respectively. The tg2 gate pulse opens the gates 206, 208, 210 and passes 90°, 180°, and 270° pulses from counter 202 which appear during the $tg2$ gate period to generate timing pulses $t_1$, $t_2$ and $t_3$ respectively.

Counter 216 is cleared (reset to zero) by $t_4$ pulse and counts the number of pulses which pass through gate 214. Thus, at each trailing edge of $tg1$, the contents of counter 216 is equal to $f_2$. Register 226 is cleared by timing pulse $t_1$, and the value $f_2$ in counter 216 is transferred to register 226 through gate means 220, 224 by timing pulse $t_2$. By timing pulse $t_3$, contents of register 218, which is a fixed value $f_k$, is added to register 226 through gate means 222, 224 and add-subtract switching means 244.

Thus, contents of register 226 is renovated during each $t_1 - t_3$ pulse period, that is, once in each 1/16 second.

When $f_1$ has reached the predetermined value in a starting control, the timing pulses $t_1$, $t_2$, and $t_3$ are interrupted (circuit not shown in the drawing) to maintain $f_1$ at the predetermined value. When the predetermined value is the frequency of the commercial power supply, motor 40 may be directly connected to the commercial power supply line, if desired, disconnecting contacts 110, 112 (FIG. 3).

Another simple control is the simple manual speed control. In the simple manual speed control, the motor has to reach the desired velocity in the same way as in the starting control. But different from the starting control, the motor must be rotated in either direction and must be either accelerated or decelerated. This means that $f_2$ and $f_k$ may be either positive or negative.

For this reason counter 216, register 218, and register 226 have one each sign bit 216S, 218S and 226S which represents the polarity (sign) of the contents. Sign bit 216S is determined by the direction of the motor rotation, and may be detected by tachometer 41. Sign bit 218S is determined by the direction of the error signal and, in manual control, is set by the operator. Sign bit 216S is transferred to sign bit 226S by timing pulse $t_2$. If sign bit 218S and sign bit 226S are not equal, logic circuit 248 delivers an output and controls add-subtract switching means 244 to establish a subtracting circuit between register 218 and 226. This means that a decelerating torque will be developed in the motor.

Sign bit 226S controls the direction of phase rotation of the supply frequency by controlling countphase detector logic circuit of counter 242 (circuit not shown in the drawing). When the desired velocity is reached, timing pulses $t_1$, $t_2$ and $t_3$ are interrupted.

Another item to be considered is the frequency limit. The acceleration frequency should not exceed the maximum limit $f_{1m}$ allowable for the motor. This frequency limiter means in this embodiment comprises register 228, comparator 230, and gate means 232, 234, 236. Comparator 230, comparing the contents $f_1$ of register 226 with the contents $f_{1m}$ of register 228, delivers an output signal when $f_1 \geq f_{1m}$. This output signal opens gate means 234 and pass $f_{1m}$, instead of $f_1$ which is interrupted by closed gate means 232, to be repeatedly added to accumulator 238 at each $t_o$ pulse.

Before coming to the supplementary circuits for more precise control requirements, the voltage signal corresponding to $f_1$ will be explained.

Voltage signal generator means 13 generates the reference signal for the rectified voltage of main rectifier 12. In ordinary running of an induction motor, the produced magnetic flux is to be maintained at a constant value which is determined by the design of the motor. This means that the exciting current $I_o$ must be kept at a constant value $I_{om}$. In usual design practice, $I_{om}$ corresponds to the maximum tolerable saturation of the magnetic flux.

Referring again to FIG. 1, voltage $V_1$, which generates an exciting current $I_{om}$ is $$V_1 = I_{om} \sqrt{R_o^2 + (2\pi f_1 L_o^2)} \tag{8}$$

Since $I_{om}$, $R_o$, $L_o$ are fixed values for a fixed type of motor, $V_1$ is equation (8) may be easily calculated by any conventional digital or analog circuit. In the embodiment of this invention, equation (8) is further approximated by two linear equations.

$$V_1 = I_{om} \{ R_o + \frac{1}{2}(2\pi f_1 L_o) \} \qquad \pi f_1 L_o \leq R_o$$

$$\text{or} \frac{V_1}{2\pi L_o I_{om}} = \frac{R_o}{2\pi L_o} + \frac{f_1}{2} \tag{8)'}$$

$$V_1 = I_{om}(2\pi f_1 L_o) \qquad \pi f_1 L_o \geq R_o$$

$$\text{or} \frac{V_1}{2\pi L_o I_{om}} = f_1 \tag{8)''}$$

Figure 5:
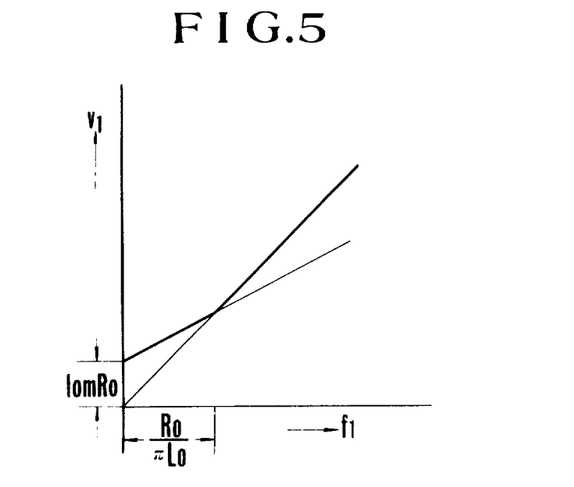
FIG. 5 is a graph of assistance in explaining an approximation formula of the relation between the variable frequency and the variable voltage.

FIG. 5 illustrates these two approximating equations (8)' and (8)''. Since $2\pi L_o I_{om}$ is a constant for a fixed motor type, the value $V_1/2\pi L_o I_{om}$ can be used as the voltage signal.

Figure 6:
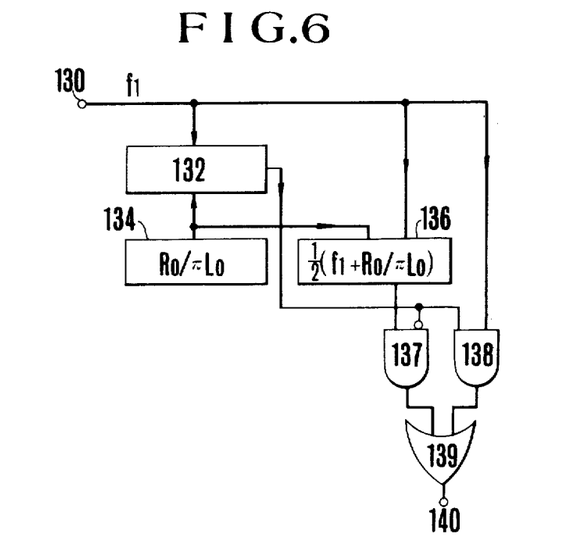
FIG. 6 is a schematic block diagram of an embodiment of the voltage signal generator of this invention.

One example for generating the voltage signal in accordance to equations (8)' and (8)'' is illustrated in FIG. 6. The value of $f_1$ which is stored in register 226 (FIG. 4) is delivered to voltage signal generator means 13 from terminal 130. Register 134 stores the fixed value $R_o/\pi L_o$, and register 136 stores the value $(f_1 + R_o/\pi L_o)/2$ which is renovated as $f_1$ is renovated. Comparator 132, comparing the value $f_1$ with the value $R_o/\pi L_o$, opens gate means 138, 139 to deliver $f_1$ as the voltage signal when $f_1 \geq R_o/\pi L_o$, and opens gate means 137, 139 to deliver the contents of register 136 as the voltage signal when $f_1 < R_o/\pi L_o$. In FIG. 6, timing pulses and date renovation circuit for register 136 are not illustrated for the sake of simplicity.

Returning again to frequency generating means 20, the contents of register 218 (FIG. 4) may be controlled either manually or automatically by the error signal of a feedback control system or by the command signal of a programmed control system. In this case a slip frequency limiter means which limits the magnitude of the contents of register 218 within the magnitude of $f_k$ must be provided. This slip frequency limited means (not shown in the drawing) is similar to the supply frequency limiter means comprising register 228, comparator 230, and gate means 232, 234, 236, and no further explanation will be necessary.

When the contents of register 218 is controlled by the error signal, the generated frequency $f_1$ is in the relation of equation (6)', and this frequency $f_1$ will be called a control frequency. Also the frequency $f_1$ which is in the relation of equation (7)' will be called a control frequency. Practically a same value of $f_s$ will be obtained from both equations. But the motor performance is different.

When the total moment of inertia and the equivalent total friction constant exerted on the motor shaft are denoted by J and F respectively, the developed torque $T_1$ is balanced by $$T_1 = (J_p + F)f_2 \qquad (9).$$

$T_1$ is a function of $f_s$ and when $f_s$ and when $f_s$ is small, $T_1$ is approximately proportional to $f_s$ (equation 1). Since $f_s$ is small when the motor is controlled by the control frequency.

$$T_1 = K_s f_s = (J_p + F)f_2 \qquad (10)$$

where $K_s$ is a constant.

We obtain from equation (6)' by substituting $f_s$ of equation (10), $$\theta_a = \frac{\theta_c}{1 + \frac{F}{G_1 K_s} p + \frac{J}{G_1 K_s} p^2} \qquad (6)''$$

Similarly from equation (7)', $$\theta_a = \frac{\theta_c}{1 + \left(\frac{F + K_s}{G_1 K_s}\right) p + \frac{J}{G_1 K_s} p^2} \qquad (7)''$$

In equation (7)'', a speed feedback term $K_s$ is developed in addition to $F$, and in most cases this term is advantageous in stabilizing the servo-mechanism.

Figure 7:
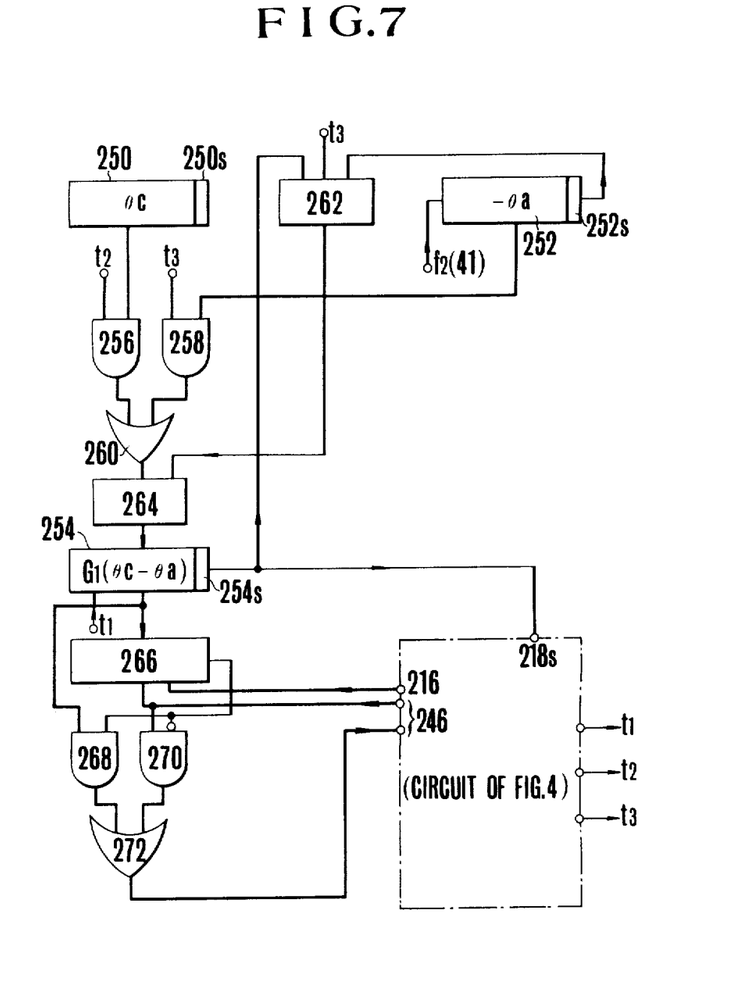
FIG. 7 is a schematic block diagram of an embodiment of means for generating the control frequency.

Therefore, in the preferred embodiment as shown in FIG. 7, the control frequency is generated in the relation of equation (7)'.

Referring to FIG. 7, register 250 receives and stores the command signal $\theta_c$. The controlled variable $\theta_a$ may be detected in any conventional means, and in this embodiment, $\theta_a$ is obtained by integrating $f_2$ in counter 252. Counter 252 is a reversible counter since $f_2$ can be either positive or negative, has a counting capacity of at least equal to the maximum value of $\theta_c$, and must be provided with data reset mechanism for the initial value setting. (These related circuits are not shown in the drawing.) Register 254 which stores the control frequency signal $G_1$ ($\theta_c-\theta_a$) is cleared by timing pulse $t_1$, and the contents of register 250 is transferred to register 254 through gate means 256, 260 by timing pulse $t_2$.

In this embodiment $G_1$ is $2^n$, and multiplication by $G_1$ means n bit shift in a register. By timing pulse $t_3$, contents of counter 252, which is $-\theta_a$, is added to register 254 through gate means 258, 260 and add-subtract switching means 264. Add-substract switching means 264, logic circuit 262, and sign bits 250s, 252s, 254s, are similar to add-subtract switching means 244, logic circuit 248, and sign bits 216s, 218s, 226s (of FIG. 4) respectively and no further explanation will be necessary.

In a feedback control system, as long as the value of the error signal is beyond a certain range, the error must be decreased with the highest attainable velocity of the motor; and when the error comes within this range, the motor velocity must be feedback-controlled by the error signal to have the motor follow the command signal. Therefore the direction of $f_k$ is controlled by the direction of the error signal, that is, bit 218s is determined by bit 254s; and switching gate means 246 (FIG. 4) comprising comparator 266 and gate means 268, 270, 272, is provided to select either one of the two frequency signals, the one being the acceleration frequency signal registered in register 226 and the other being the control frequency signal registered in register 254.

In other words, comparator 266 is a slip frequency limiter means which limits the magnitude of the slip frequency within the magnitude of $f_k$. Hence, comparator 266 delivers an output signal which opens gate means 268 and interrupts gate means 270, when and only when the control frequency (contents of register 254) is nearer to the motor velocity $f_2$ (contents of register 216) than the acceleration frequency (contents of register 226).

When gate means 268 are open, the control frequency signal $G_1$ ($\theta_c-\theta_a$) which is stored in register 254 is repeatedly added to accumulator 238 through gate means 268, 272 and gate means 232, 236 (FIG. 4) at each $t_o$ pulse for generating the control frequency pulse at the output terminal of counter 242 (FIG. 4). When the control frequency signal is added to accumulator 238, sign bits 254s controls count-pulse detector logic circuit of counter 242 for controlling the phase rotation of the supply frequency. (Circuit not shown in the drawing.)

Thus, $\theta_a$ is controlled as expressed by the transfer function of equation (7)''.

By the adaptive control system of this invention, the velocity of an induction motor can be maintained in a high precision independent of the load fluctuations. In this case, the command signal is $p\theta c$, which is generated, for example, by a high accuracy crystal oscillator or by a high precision frequency synthesizer when variable velocity is desired. A counter (not shown in the drawings) is provided to integrate $p\theta c$ and generate $\theta_c$. The capacity of this counter need not be large since only the rate of increase of $\theta_c$ is concerned.

When the motor is controlled by the control frequency, $f_1 = G_1(\theta_c - \theta_a)$. Differentiating both sides, we obtain $pf_1 = G_1(p\theta c - f_2)$. When a stationary state is reached, $pf_1=0$ and $f_2=p\theta c$.

Furthermore, the efficiency of the motor can be controlled by the adaptive control system of this invention. A most simple example of efficiency control will be explained. The electromechanical conversion efficiency $e_1$ of an induction motor is expressed by $$e_1 = \frac{I_s{}^2 R_L}{I_o{}^2 R_o + I_s{}^2 (R_1 + R_2 + R_L)} \qquad (11)$$

When $R_1$ is negligible compared to $R_2+R_L$, and $R_o{}^2$ is negligible compared to $(2\pi f_1 L_o)^2$, the slip frequency $f_e$ at which $e_1$ becomes maximum is expressed by, $$f_e = \frac{k_1 R_2}{2\pi (L_1 + L_2)^2 + \frac{R_2}{R_o} L_o{}^2} \qquad (12)$$

where $k_1 = 1-s$, and $k_1$ may be approximated by a constant where $s$ is small. Thus, $f_e$ is approximately a constant independent of $f_1$.

When the slip frequency $f_s$ under the maximum allowable voltage $V_1$, which is defined by equation (8), is greater than $f_e$, the efficiency of the motor cannot be improved. On the contrary, when $|f_s| < |f_e|$, the supply voltage $V_1$ can be decreased to improve the efficiency.

For this efficiency control, an error signal generator means (not shown in the drawing) is provided to produce error signal $f_r$ in a relation $f_r - f_{el} = f_s = f_{el} + f_2 - f_1$, where $f_{el}$ is a predetermined value which is not smaller than $f_e$, and will be called a second value of slip frequency. The second value of slip frequency $f_{el}$ may be equal to $f_e$. But, from consideration of other losses, there may be cases where $f_{el}$ is determined at a value larger than $f_e$.

The voltage signal $V_1$ is modified by $f_r$ as $V_1 = I_{om} R_o{}^2 + (2\pi f_1 L_o)^2 - G_2 f_r$. Decrease of $V_1$ increases $f_s$ and when $G_2$ is sufficiently large, the balance is obtained at $f_s = f_{el}$. And, as for the frequency, the increase of $f_s$ will be compensated by the corresponding increase of $f_1$ when $f_2$ is the controlled variable.

Figure 8:
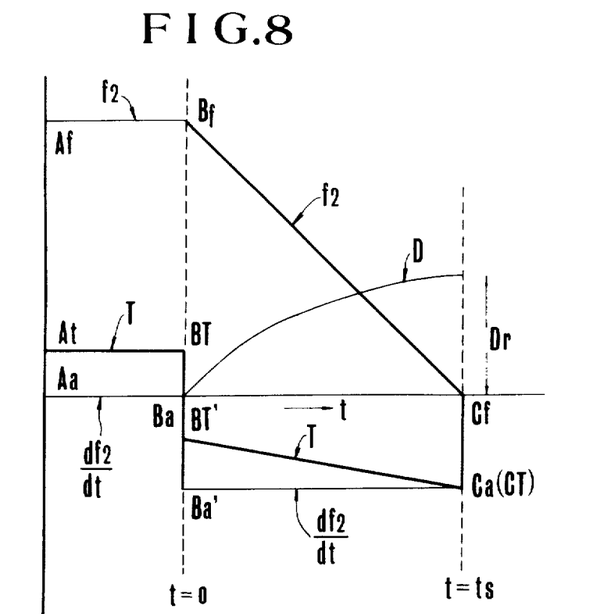
FIG. 8 is a graph of assistance in explaining an example of data programming in the programmed control system of this invention.

Referring now to FIG. 8, a simple example of a programmed control system of this invention will be explained. Suppose an electric railway car driven by an induction motor is braked to stop at a predetermined point. The x-axis of FIG. 8 is time $t$. The velocity $f_2$ is to be controlled as shown by curve $A_f - B_f - C_f$. The distance D travelled in time $t$ is $f_2/p$. The acceleration which is $pf_2$ is shown by curve $A_a - B_a - B_a' - C_a$. When torque $T_1$ is approximated by $T_1 = (J_p + F)f_2$, curve $A_T - B_T - B_T' - C_T'$ represents the torque to be developed by the motor.

When $T_1$ and $f_2$ are known, $f_1$ can be calculated from equation (1), as $V_1{}^2 = I_{om}{}^2 \{R_a{}^2 + (2\pi f_1 L_o)2\}$ and $f_s = f_1 - f_2$. The value of $f_1$ required to develop torque $T_1$ at velocity $f_2$ may also be determined by direct measurement in the dynamic test of the motor.

Thus the value of $f_1$ as a function of time $t$ or as a function of other detectable variable, for example, distance D can be programmed and registered in a memory means. This memory means of programmed $f_1$, together with a detector of the detectable variable, for example a clock generator when the detectable variable is time, is provided in frequency generating means 20 (FIG. 3). The programmed $f_1$ is read-out by the detected variable (for example by the clock pulse), and by this read-out value of $f_1$, the contents of register 226 (FIG. 4) is renovated.

In most practical cases, programmed control system is combined with feedback control system. For an example, the distance D as a function of time $t$ (FIG. 8) may be registered in a memory means and be read-out as the command signal. The contents of register 250 (FIG. 7) is renovated by the read-out command signal D. Any conventional means for detecting the travelled distance may be used for producing the error signal. For example, when the wheel of the electric car has no slip, the distance travelled by the car is $K_D f_2/p$ where $K_D$ is a proportional constant. Counter 252 (FIG. 7) integrates $f_2$ and the control frequency signal in register 254 is determined by $G_1(D - K_D f_2/p)$. This type of programmed control will be suitable for elevator control or for traction-motor control.

Figure 10:
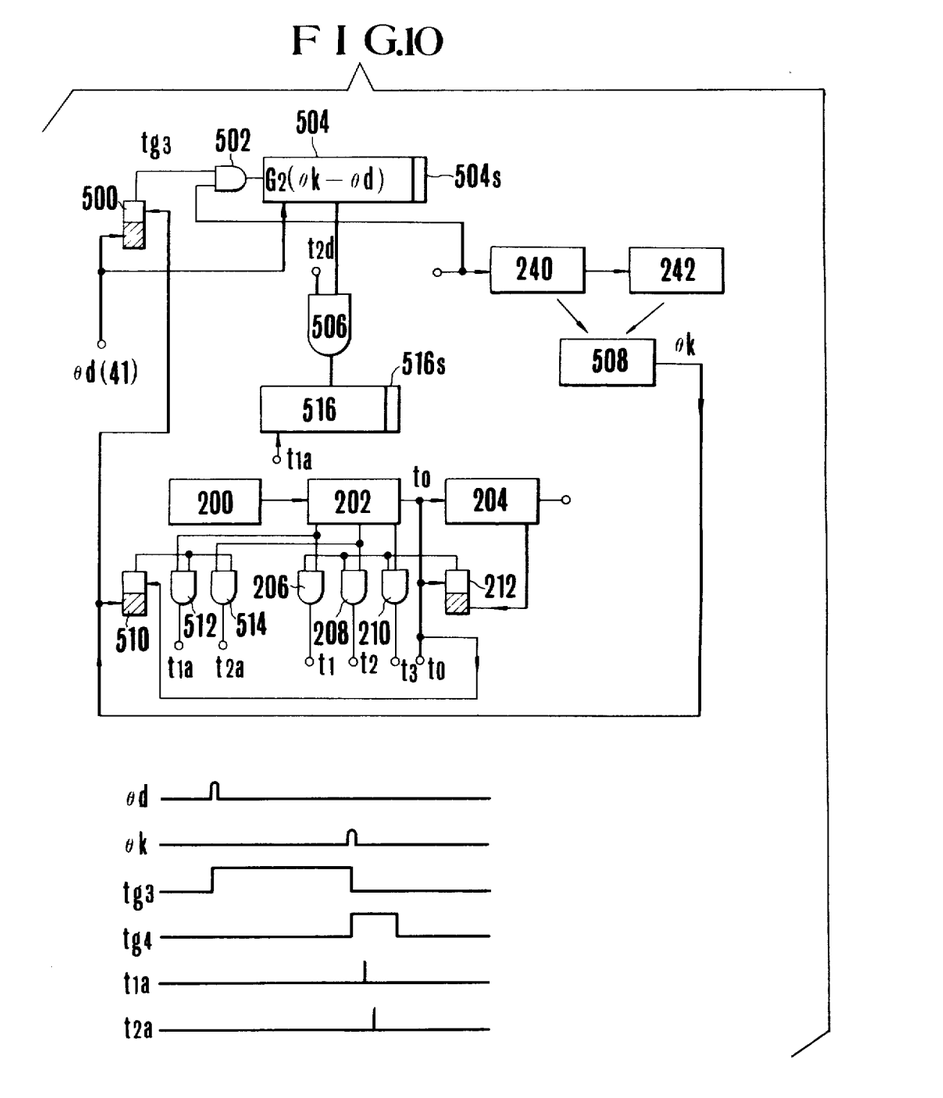
FIG. 10 is a schematic block diagram of an embodiment of means for generating the acceleration frequency of a synchronous motor and a legend showing various waveforms.

Referring now to FIG. 10, the adaptive control system of this invention for a synchronous motor will be explained. It will be apparent from the foregoing explanations that a control system of this invention for an induction motor can be changed to a corresponding control system for a synchronous motor when $f_s$ and $f_k$ are respectively substituted by $\theta_d$ and $\theta_k$, where $\theta_k$ is a predetermined value of the load angle which is not larger than $\theta_T$. This predetermined value $\theta_k$ will be called a first value of load angle.

The control frequency signal which is the contents of register 254 of FIG. 7 may be used as the control frequency signal of a synchronous motor. In a synchronous motor the control frequency may also be the control phase which can be generated by a variable phase-shifting circuit, the amount of phase-shift being controlled by the error signal. Any conventional type of controllable phase-shifting circuit may be used for this purpose and will be briefly explained in the later paragraph.

For a synchronous motor, tachometer generator 41 (FIG. 3) is provided with a phase detector. Phase detector 41 of this embodiment is a device for generating a single pulse at each zero phase of the motor rotation. This pulse will be called $\theta_d$ pulse. Flip-flop 500 (FIG. 10) is triggered on by $\theta_d$ pulse. Counter 504 is also cleared by $\theta_d$ pulse. The pulse corresponding to the first value of load angle $\theta_k$ will be called $\theta_k$ pulse. This $\theta_k$ pulse is detected by a count phase detector logic circuit 508 connected to counters 240 and 242. (Refer also to FIG. 4). The $\theta_k$ pulse triggers off flip-flop 500 generating a rectangular gate pulse as designated by $tg3$ and illustrated by the wave form diagram of FIG. 10. The gate pulse $tg3$, which has a width corresponding to the phase difference $\theta_k - \theta_d$, opens AND-gate 502 to pass the overflow pulse of accumulator 238 (FIG. 4) which has $96f_1$ frequency in the numerical example as explained in reference to FIG. 4. Counter 504 counts the number of pulses which pass gate 502. Therefore the count of counter 504 after the trailing edge of $tg3$ corresponds to phase difference $\theta_k - \theta_d$, the unit being 360°/96, and the data being renovated at each one cycle of $f_2$. When $\theta_k$ appears earlier than $\theta_d$, a negative sign is introduced to sign bit 504S of counter 504. (Circuit not shown in the drawing).

In order to transfer the contents of counter 504, timing pulses $t_{1a}$ and $t_{2a}$ are generated. Flip-flop 510 is triggered on by $\theta_k$ pulse and triggered off by the succeeding $t_o$ pulse from counter 202 to generate a gate pulse $tg4$ as illustrated in the wave form diagram. Gate pulse tg4 opens AND-gates 512 and 514. The 90° and 180° pulses of the output 202 pass gate 512 and 514 during $tg4$ pulse and the timing pulses $t_{1a}$ and $t_{2a}$ are generated respectively.

Contents of counter 504 may be transferred either to register 218 (corresponding to the control expressed by equation 6) or to register 226 (corresponding to the control expressed by equation 7). Register 516 of FIG. 10 represents either register 218 or register 226 of FIG. 4. Register 516 is cleared by timing pulse $t_{1a}$ and the contents of counter 504 is transferred to register 516 by timing pulse $t_{2a}$.

As explained in the former paragraphs, the frequency control systems illustrated in FIG. 4, FIG. 7, and FIG. 10 may be substituted by corresponding phase control systems. One example of the phase control systems, with which the load angle is maintained at $\theta_k$, will be explained. The pulse train generated by tachometer 41 which has $32f_2$ frequency, is counted by a counter of 5 bit ($2^5$) capacity. (Not shown in the drawing.) When this counter is reset to zero at $\theta_d$ pulse, the instantaneous angular position of the motor (or the instantaneous angular position of Vector $V_d$ of FIG. 9b) is represented by the count of the counter, the unit being 360°/32. A count-phase detector logic circuit (not shown in the drawing) to detect the count phases 360° $- \theta_k$, 360° $- (\theta_k - 120°)$, and 360° $- (\theta_k + 120°)$ is connected to the counter, and three-phase pulses having a lead angle $\theta_k$ to Vector $Vd$ are detected. These three-phase pulses are used as the output of frequency generating means 20 to control the phase of the supply frequency.

Obviously, the angular resolution of 360°/32 is low for the control purpose, but it will be very easy to increase the number of pulses generated per one revolution of the motor with the corresponding increase in the counter capacity.

Also it must be noted that the value of $\theta_k$ may be controlled by controlling the count-phase of the count-phase detector logic circuit.

In a starting control of a synchronous motor, the circuit of FIG. 10 cannot generate the acceleration frequency at a stand-still of the motor. Therefore a fixed value corresponding to the starting frequency of the synchronous motor must be registered in register 516 at the starting operation. This fixed value corresponds to $f_k$ of an induction motor.

As for the voltage signal of a synchronous motor, the design flexibility may be increased by introducing the exciter current control. It is assumed that $V_1$ is controlled as to maintain the input current $I_1$ within the allowable range $I_{1m}$ when the load angle $\theta_d$ does not exceed the first value of load angle $\theta_k$.

From the vector diagram of FIG. 9b) we obtain, $$V_1 = K_u f_1 \cos \theta_k + \sqrt{I_{1m}^2 R_1^2 + f_1^2 \ (2\pi L_1 I_{1m})^2 - (K_v \sin \theta_k)^2} \quad (13).$$

When $K_v$ is not controlled, the first term $K_u f_1 \cos \theta_k$ is proportional to $f_1$ and the second term is analogous to equation (8) for an induction motor. Therefore $V_1$ for a synchronous motor can be approximated in a similar manner as illustrated in FIG. 5 and can be generated by a similar circuit shown in FIG. 6.

The electro-mechanical conversion efficiency $\alpha_2$ of the synchronous motor armature is $$l_2 = \frac{I_1 V_d \cos \theta_1}{I_1^2 R_1 + I_1 V_d \cos \theta_1}$$

and the load angle which develops maximum $l_2$ is determined by, $$2V_1 V_d (2\pi f_1 L_1) + (V_1^2 - V_d^2) R_1 \sin \theta_d - (V_1^2 + V_d^2) (2\pi f_1 L_1) \cos \theta_d = 0 \quad (14)$$

The value of $\theta_d$ which satisfies equation (14) is denoted by $\theta l$, and a predetermined load angle which is not smaller than $\theta l$ will be called a second value of load angle corresponding to a second value of slip frequency. In a similar way as in an induction motor, the voltage $V_1$ for a synchronous motor may be controlled with reference to the second value of load angle.

The adaptive control system in which the exciting current of a synchronous motor is controlled, is well known and it will not be difficult to combine this exciting current control means with the adaptive control system of this invention for a person skilled in the art of this field after the teachings of this invention has been understood. A few examples of exciting current control will be explained.

The field exciting current and the effective resistance of the exciting circuit are denoted by $I_o$ and $R_o$ respectively. Thus $V_d = K_u f_1 = K_H f_1 I_o$.

When $f_1$ and $V_1$ are constant, $R_1$ is negligible to $2\pi f_1 L_1$, and $\theta_d$ is controlled to $\theta_k = 45°$, it will be easily demonstrated that unity power factor (zero phase angle between $V_1$ and $I_1$) is obtained when $I_o = 2 \sqrt{2\pi L_1 I_1 / K_H}$.

The electro-mechanical conversion efficiency $l_3$ including the exciting power is expressed by $$l_3 = \frac{K_H f_1 I_o I_1 \cos \theta_1}{I_o^2 R_o + I_1^2 R_1 + K_H f_1 I_o I_1 \cos \theta_1} \quad (11)'.$$

When $\theta_d$ is controlled to $\theta_k$ and $V_1$ is controlled by equation (13), the value of $K_H f_1 I_o$ which give the maximum value of $L_3$ is determined by $$K_H f_1 I_o = \frac{V_1}{\sqrt{1 + \left(\frac{2\pi L_1}{K_H}\right)^2 \frac{R_o}{R_1}}} \quad (14)'.$$

This control system for controlling $I_o$ in accordance to equation (14)' may be easily combined with the adaptive control system of this invention.

From the foregoing explanations, it will be clear that a synchronous motor can be controlled in a similar way as an induction motor, and furthermore the control flexibility for a synchronous motor may be increased by combining the exciting current control means with the adaptive control system of this invention.

In the embodiments explained with reference to FIG. 4, FIG. 6, FIG. 7, and FIG. 10, digital circuits are used. But it will be apparent that various types of analog circuits as well as other types of digital circuits may be used for the same purpose.

Figure 11A:
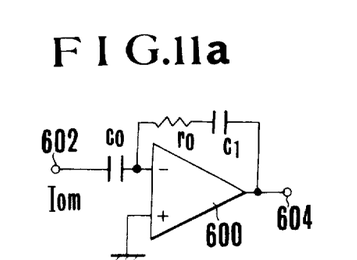

Some examples of such analog circuits will be explained with reference to FIG. 11, FIG. 11a shows an example of an analog circuit for voltage signal generator means 13. (FIG. 3). An operational amplifier 600 is feedback-connected from output terminal 604 to input terminal 602 through a resistor $r_o$ and a capacitor $C_1$. A constant voltage analogous to current $I_{om}$ (equation 8) having frequency $f_1$, is supplied to terminal 602 through capacitor $C_o$. The voltage $I_v$ at terminal 604 will be $$I_v = - I_{om} (C_o/C_1 = j2\pi f_1 C_o r_o) \quad (15).$$

When values of $C_o/C_1$, and $C_o r_o$ are analogous to $R_o$ and $L_o$ (FIG. 1) respectively, $-I_v$ is analogous to $V_1$ and may be used as the voltage signal.

Figure 11B:
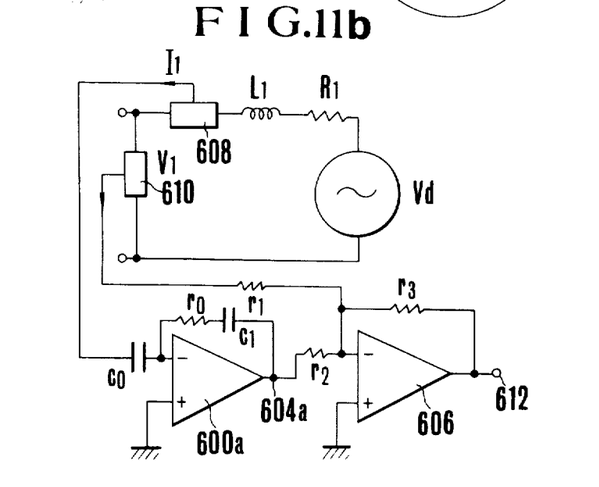

FIG. 11b is an analog circuit for detecting the load angle $\theta_d$ of a synchronous motor. $V_1, f_1, I_1, L_1, R_1, V_d$ are the same with those of FIG. 9a. Current measuring means 608 generates a voltage analogous to $I_1$ having frequency $f_1$, and voltage measuring means 610 generates a voltage analogous to $V_1$. Operational amplifier 600a which has a circuit connection similar to operational amplifier 600, receives signal $I_1$ at the input terminal and develops a voltage analogous to $- I_{1m}(R_1 = j2\pi f_1 L_1)$ at output terminal 604a. Operational amplifier 606 is connected as an analog adder and develops a voltage analogous to $V_1 - I_{1m}(R_1 = j2\pi f_1 L_1) = V_d$ at output terminal 612. The phase difference between the output voltage of voltage measuring means 610 and the output voltage at terminal 612 is the load angle $\theta_d$ of the motor.

Thus the circuit of FIG. 11b is an example of a method for indirectly determining the load angle.

Figure 11C:
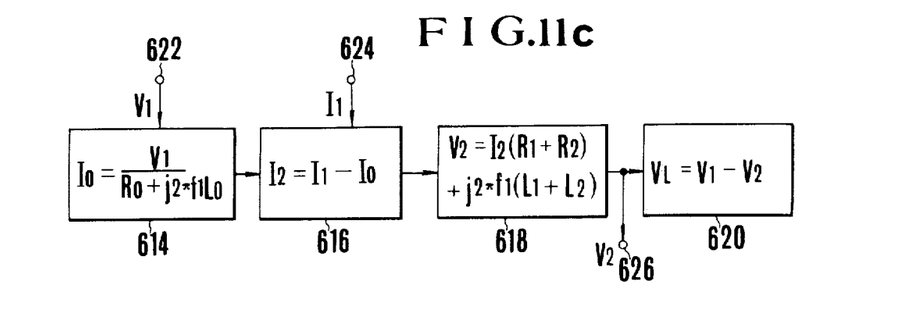

FIG. 11c illustrates an example of a method for indirectly determining the velocity $f_2$ of an induction motor. $V_1, F_1, I_1, I_o, I_2, L_o, R_o, L_1, R_1, L_2, R_2, R_L$ are the same with those of FIG. 1. A current measuring means similar to 608 of FIG. 11b and a voltage measuring means similar to 610 are provided to deliver voltage signal $V_1$ to terminal 622 and current signal $I_1$ to terminal 624 respectively. Voltage signal $V_1$ is connected through a serial connection of a resistor and a capacitor to the input terminal of operational amplifier 614 which has a feedback circuit of a capacitor and develops a voltage analogous to $- I_o = - V_1/(R_o = j2\pi f_1 L_o)$ at the output terminal. Operational amplifier 616 is similar to 606 in FIG. 11b and develops a voltage analogous to $I_2 = I_1 - I_o$ at its output terminal. Operational amplifier 618 is similar to 600 of FIG. 11a and develops a voltage analogous to $V_2 = I_2\{(R_1 + R_2) + j2\pi f_1(L_1 + L_2)\}$ at output terminal 626. Operational amplifier 620 is similar to 606 of FIG. 11b and develops a voltage analogous to $V_L = V_1 - V_2$ at output terminal 628. The voltage at terminal 626 or 628 is a measure of the velocity $f_2$ or the slip frequency $f_s$ as expressed by equation (3) or (3)'.

Figure 11D:
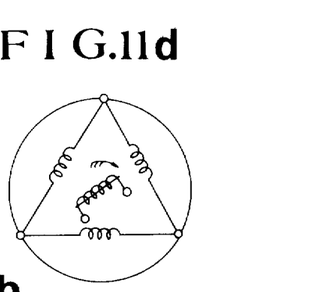

FIG. 11d illustrates an example of an analog type frequency (or phase) generating means 20 (FIG. 3) of this invention. This device is a conventional selsyn-motor. Although the rotatable secondary is illustrated as a single phase winding in the drawing, it may be poly-phase windings. When this device is used as the frequency generating means 20, the tachometer 41 (FIG. 3) is preferably a poly-phase sine wave generator of frequency $f_2$. This poly-phase frequency of $f_2$ is supplied to the poly-phase winding of the selsyn-motor to generate a rotating flux of frequency $f_2$. When the rotatable secondary is rotated at a velocity corresponding to $f_k$ in the direction opposite to the rotating flux, the frequency generated in the secondary winding will be $f_1 = f_2 + f_k$.

It is more simple to use this device as the phase generating means for a synchronous motor control. In this case, the secondary winding is fixed at an angular position which is different from the primary winding by a space angle of $\theta_k$.

Although the invention has been described in their preferred embodiments with a certain degree of particularity, it is to be understood that various changes and modifications, together with applications in diversified fields may be made in the invention without departing from the spirit and scope thereof.

What is claimed is:

1. An adaptive control system for an alternating-current motor comprising:

a poly-phase induction motor;

power supply means for generating variable frequency and variable voltage poly-phase alternating-current power to be supplied to said motor;

frequency control means for controlling said variable frequency of said power supply means;

voltage control means for controlling said variable voltage of said power supply means in relation to said variable frequency;

means for detecting the instantaneous velocity of said motor;

detector means for detecting the position error of said motor in relation to a commanded position and generating a desired slip frequency signal which is proportional to said position error;

slip frequency limiter means for generating a slip frequency signal by limiting the magnitude of said desired slip frequency signal within the magnitude of the slip frequency at which the maximum torque of said motor is developed;

means for generating a frequency signal by algebraically adding said slip frequency signal to said detected instantaneous velocity of said motor, the value of said velocity being represented by revolutions per second multiplied by the number of pole-pairs of said motor;

frequency generating means for generating a pulse frequency determined by said frequency signal, said pulse frequency controlling said frequency control means, and said frequency generating means comprising a register means for storing a digital code representative of said frequency signal, an accumulator means for storing the integrated value of said frequency signal and delivering overflow pulses, digital adder logic circuits for periodically adding the contents of said register means to the contents of said accumulator means, and pulse counter means for dividing the frequency of said overflow pulses to generate said pulse frequency; and voltage signal generating means for generating a voltage signal in relation to said frequency signal as the reference signal for said voltage control means.

2. An adaptive control system for an alternating-current motor according to claim 1 wherein said means for detecting the position error of said motor in relation to a commanded position is provided with a generator means for generating a frequency corresponding the commanded velocity for said motor, and means for integrating said frequency corresponding the commanded velocity of said motor to produce said commanded position.

3. An adaptive control system for an alternating-current motor according to claim 1 wherein said means for detecting the position error of said motor in relation to a commanded position is provided with data memory means for storing the data of said commanded position as a function of time, and data memory reading means including a clock generator for reading-out said stored data of said commanded position, said read-out data being used as said commanded position in detecting said position error of said motor.

4. An adaptive control system for an alternating-current motor according to claim 1 wherein said voltage signal generating means comprises a register means for storing a first digital code representative of a predetermined constant which is determined by the performance parameters of said motor, an adder means (136) for producing a second digital code which represents one half of the sum of said first digital code and a third digital code representative of said frequency signal, and switching gate means including comparator means for comparing said first digital code representative of a predetermined constant with said third digital code representative of said frequency signal to deliver either said third digital code representative of said frequency signal or said second digital code which represents one half of the sum of said first digital code and said third digital code, as said voltage signal.

5. An adaptive control system for an alternating-current motor comprising:
 a poly-phase induction motor;
 power supply means for generating variable frequency and variable voltage poly-phase alternating-current power to be supplied to said motor;
 voltage control means for controlling said variable voltage of said power supply means in relation to said variable frequency;
 means for detecting the instantaneous velocity of said motor;
 detector means for detecting the position error of said motor in relation to a commanded position and generating a control frequency signal which is porportional to said position error;
 means for generating an acceleration frequency signal by algebraically adding a predetermined slip frequency signal to said detected instantaneous velocity of said motor, the value of said velocity being represented by revolutions per second ultiplied by the number of pole-pairs of said motor, the magnitude of said predetermined slip frequency signal being not larger than the slip frequency at which the maximum torque of said motor is developed, and the direction of said predetermined slip frequency signal being determined in accordance with the direction of said position error;
 switching gate means including comparator means for comparing said control frequency signal with said acceleration frequency signal to deliver either said control frequency signal or said acceleration frequency signal to a frequency generating means, said control frequency being delivered when and only when said control frequency signal is nearer to said motor velocity as represented by revolutions per second multiplied by the number of pole-pairs of said motor than said acceleration frequency;
 frequency generating means for generating a pulse frequency determined by said frequency signal delivered from said switching gate means, said pulse frequency controlling said frequency control means, and said frequency generating means comprising a register means for storing a digital code representative of said frequency signal, an accumulator means for storing the integrated value of said frequency signal and delivering overflow pulses, digital adder logic circuits for periodically adding the contents of said register means to the contents of said accumulator means, and pulse counter means for dividing the frequency of said overflow pulses to generate said pulse frequency; and
 voltage signal generating means for generating a voltage signal in relation to said frequency signal as the reference signal for said voltage control means.

6. An adaptive control system for an alternating-current motor according to claim 5 wherein said means for detecting the position error of said motor in relation to a commanded position is provided with a generator means for generating a frequency corresponding the commanded velocity for said motor, and means for integrating said frequency corresponding the commanded velocity of said motor to produce said commanded position.

7. An adaptive control system for an alternating-current motor according to claim 5 wherein said means for detecting the position error of said motor in relation to a commanded position is provided with data memory means for storing the data of said commanded position as a function of time, and data memory reading means including a clock generator for reading-out said stored data of said commanded position, said read-out data being used as said commanded position in detecting said position error of said motor.

8. An adaptive control system for an alternating-current motor according to claim 5 wherein said voltage signal generating means comprises a register means for storing a first digital code representative of a predetermined constant which is determined by the performance parameters of said motor, an adder means for producing a second digital code which represents one half of the sum of said first digital code and a third digital code representative of said frequency signal, and switching gate means including comparator means for comparing said first digital code representative of a predetermined constant with said third digital code representative of said frequency signal to deliver either said third digital code representative of said frequency signal or said second digital code which represents one half of the sum of said first digital code and said third digital code as said voltage signal.

9. An adaptive control system for an alternating-current motor comprising:
 a poly-phase synchronous motor;
 power supply means for generating variable frequency and variable voltage poly-phase alternating-current power to be supplied to said motor;
 frequency control means for controlling the phase angle and the frequency of said variable frequency of said power supply means;
 voltage control means for controlling said variable voltage of said power supply means in relation to said variable frequency;
 means for detecting the instantaneous electrical rotational frequency of the rotor of said motor together with the instantaneous electrical rotational phase angle of said rotor with respect to a stator reference;
 detector means for detecting the position error of said motor in relation to a commanded position and generating a desired load angle signal which is proportional to said position error;
 load angle limiter means for generating a load angle signal by limiting the magnitude of said desired load angle signal within the magnitude of the load angle at which the maximum torque of said motor is developed;
 means for generating a phase angle signal by algebraically adding said load angle signal to said detected instantaneous electrical rotational phase angle of said rotor with respect to a stator reference;

frequency generating means for generating a voltage having a frequency determined by said instantaneous electrical rotational frequency of said rotor and a phase angle which is determined by said phase angle signal, said generated voltage controlling said frequency control means; and voltage signal generator means for generating a voltage signal in relation to said instantaneous electrical rotational frequency of said rotor, said voltage signal being used as the reference signal for said voltage control means.

10. An adaptive control system for an alternating-current motor according to claim 9 wherein said means for generating said phase angle signal comprises:

tachometer generator coupled to the motor rotation for generating a train of pulses, the recurrence frequency of said pulses being proportional to said instantaneous electrical rotational frequency of said rotor pulse counter means for receiving said train of pulses from said tachometer generator and counting the number of said received pulses, said pulse counter means being reset to zero when said detected instantaneous electrical rotational phase angle of said rotor with respect to said stator reference becomes zero; and count-phase detector logic circuit means connected to said counter means for detecting the phase-angle which is determined by said load angle signal and delivering a pulse at each of said detected phase angle.

11. An adaptive control system for an alternating-current motor according to claim 9 wherein said means for detecting the position error of said motor in relation to a commanded position is provided with a generator means for generating a frequency corresponding the commanded velocity for said motor, and means for integrating said frequency corresponding the commanded velocity of said motor to produce said commanded position.

12. An adaptive control system for an alternating-current motor according to claim 9 wherein said means for detecting the position error of said motor in relation to a commanded position is provided with data memory means for storing the data of said commanded position as a function of time, and data memory reading means of said commanded position, said read-out data being used as said commanded position in detecting said position error of said motor.

13. An adaptive control system for an alternating-current motor according to claim 9 wherein said voltage signal generating means comprises a register means for storing a first digital code representative of a predetermined constant which is determined by the performance parameters of said motor, an adder means for producing a second digital code which represents one half of the sum of said first digital code and a third digital code representative of said frequency signal, and switching gate means including comparator means for comparing said first digital code representative of a predetermined constant with said third digital code representative of said frequency signal to deliver either said third digital code representative of said frequency signal or said second digital code which represents one half of the sum of said first and said third digital code as said voltage signal.

* * * * *